UNITED STATES PATENT OFFICE.

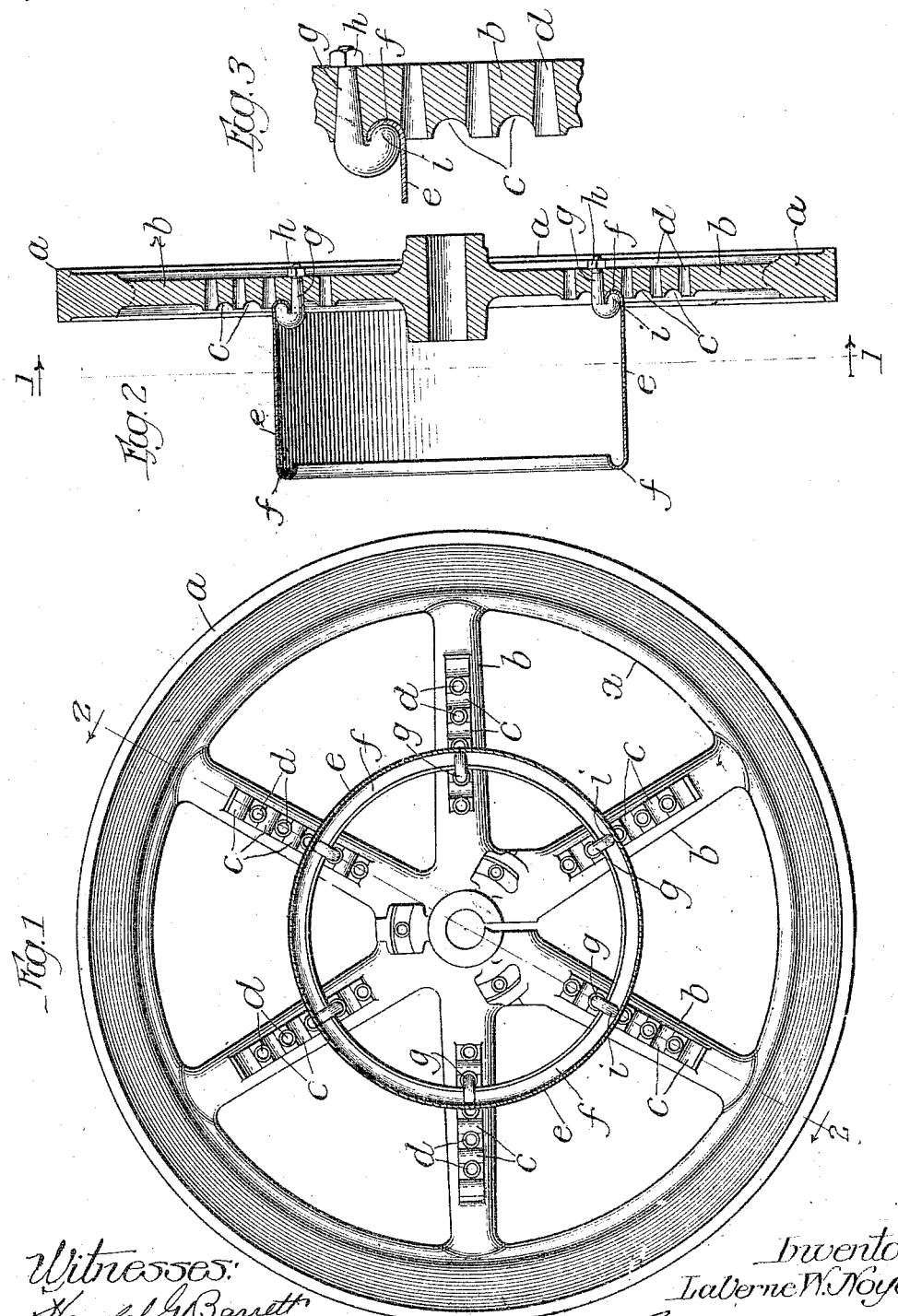

LA VERNE W. NOYES, OF CHICAGO, ILLINOIS.

PULLEY.

1,006,262.

Specification of Letters Patent.   Patented Oct. 17, 1911.

Application filed April 24, 1911.   Serial No. 623,050.

*To all whom it may concern:*

Be it known that I, LA VERNE W. NOYES, a citizen of the United States, residing at Chicago, in the county of Cook and State of Illinois, have invented a certain new and useful Improvement in Pulleys, of which the following is a full, clear, concise, and exact description, reference being had to the accompanying drawings, forming a part of this specification.

My invention relates to pulley structures and has for its object the provision of an improved construction whereby pulley rims may be secured to pulley rim mountings without the intervention of pulley spokes.

Generally speaking my invention resides in a pulley rim and a pulley rim mounting carrying pulley rim fastening members provided with hook portions in engagement with said pulley rim.

In the preferred embodiment of my invention the pulley rim is provided with a dished anchoring flange while the fastening members are provided with hooked or returned ends that enter the dish of the flange to hold the flange in engagement with the pulley rim mounting. Clamping means are desirably employed for removably securing the fastening members in place upon the pulley rim mounting. The clamping means are desirably in the form of nuts that engage threaded extensions of the hooked portions, which threaded extensions pass through the pulley rim mounting.

I will explain my invention more fully by reference to the accompanying drawing showing the preferred embodiment thereof and in which—

Figure 1 is a view in sectional elevation on line 1 1 of Fig. 2; Fig. 2 is a view in cross section on line 2 2 of Fig. 1; and Fig. 3 is a detail sectional view.

Like parts are indicated by similar characters of reference throughout the different figures.

The pulley rim mounting illustrated is in the form of the fly wheel $a$ of an internal combustion engine, though I do not limit myself to the use of a fly wheel as a mounting for the pulley rim. The wheel $a$ is provided with spokes $b$ that radiate from the wheel center. A series of annularly-disposed cavities $c$ extend through the wheel spokes, the cavities in each annular set being equidistant from the axis of the wheel.

Bolt apertures $d$ extend through the spokes in directions parallel to the axis of rotation of the wheel. By reason of the plurality of sets of annularly-disposed cavities $c$ the wheel $a$ is adapted to hold pulley rims of different diameters in position, a pulley rim $e$ of one size being illustrated in position. This pulley rim is provided with at least one dished anchoring flange $f$ which is desirably circumferentially continuous and which is received within one set of annularly disposed cavities $c$. Fastening members are carried by the wheel, these fastening members desirably residing in bolts having threaded stems $g$ and clamping nuts $h$. The parts of the bolts opposite the ends engaged by the nuts $h$ are provided with hooked or returned ends $i$ that are received within the dish of the flange $f$, the anchoring flange being curled so that the returned ends or portion $i$ of each fastening member is received within the cavity so that the rim proper is upon one side of each portion $i$ and the free side of the flange is upon an opposite side of each portion $i$. By tightening the nuts $h$ the flange portion of the pulley rim is securely clamped between the hooks $i$ and the flange seats formed by the cavities $c$.

I do not wish to be limited to the clamping nuts $h$ nor to the dished flange upon the pulley rim, since the most important feature of my invention resides in the fastening members having hooked portions $i$. The embodiment of the invention illustrated, however, is preferred since the pulley rims may readily be interchanged and may readily be replaced by pulleys of different sizes, one pulley rim mounting thus being adaptable to pulley rims of varying diameters.

Having thus described my invention, I claim as new and desire to secure by Letters Patent the following:—

1. A pulley rim provided with a curled anchoring flange that affords a cavity for the reception of fastening members, in combination with a pulley rim mounting, fastening members carried by the pulley rim mounting and which fastening members are provided with returned portions received within said cavity in position to have the rim proper of the pulley upon one side of each of the returned portions and the free side of the flange upon an opposite side of each of the returned portions, and clamping means for removably securing the fastening members in engagement with the pulley rim mounting and pulley rim.

2. A pulley rim provided with a curled anchoring flange that affords a cavity for the reception of fastening members, in combination with a pulley rim mounting, and fastening members carried by the pulley rim mounting and which fastening members are provided with returned portions received within said cavity in position to have the rim proper of the pulley upon one side of each of the returned portions and the free side of the flange upon an opposite side of each of the returned portions.

In witness whereof, I hereunto subscribe my name this 15th day of April A. D., 1911.

LA VERNE W. NOYES.

Witnesses:
   DANIEL R. SCHOLES,
   L. C. WALKER.